United States Patent
Rupe et al.

(10) Patent No.: US 11,770,321 B2
(45) Date of Patent: *Sep. 26, 2023

(54) SYSTEMS AND METHODS FOR TESTING WIRELESS MOBILE NETWORK DEVICES

(71) Applicant: CABLE TELEVISION LABORATORIES, INC., Louisville, CO (US)

(72) Inventors: Jason W. Rupe, Lafayette, CO (US); Curtis D. Knittle, Superior, CO (US); Jingjie Zhu, Erie, CO (US); John Phillips, Fort Collins, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,943

(22) Filed: Oct. 4, 2021

(65) Prior Publication Data
US 2022/0029908 A1 Jan. 27, 2022

Related U.S. Application Data

(63) Continuation of application No. 16/413,434, filed on May 15, 2019, now Pat. No. 11,140,062.

(60) Provisional application No. 62/671,599, filed on May 15, 2018.

(51) Int. Cl.
*H04L 43/50* (2022.01)
*H04L 12/28* (2006.01)
*H04L 69/40* (2022.01)

(52) U.S. Cl.
CPC ............ *H04L 43/50* (2013.01); *H04L 12/287* (2013.01); *H04L 69/40* (2013.01); *H04L 12/2801* (2013.01)

(58) Field of Classification Search
CPC ........ H04L 43/50; H04L 12/287; H04L 69/40
See application file for complete search history.

(56) References Cited

U.S. PATENT DOCUMENTS

| | | |
|---|---|---|
| 2017/0141887 A1 | 5/2017 | Garcia et al. |
| 2018/0102868 A1 | 4/2018 | Sundaresan et al. |
| 2018/0131582 A1 | 5/2018 | Schnitzer et al. |
| 2018/0294941 A1* | 10/2018 | Chapman ............... H04B 3/487 |
| 2019/0075013 A1* | 3/2019 | Garcia ................ H04L 41/0213 |
| 2020/0092071 A1* | 3/2020 | Sun ..................... H04W 72/541 |

* cited by examiner

*Primary Examiner* — Basil Ma
(74) *Attorney, Agent, or Firm* — David Daniel Smith

(57) ABSTRACT

Methods, systems, and devices for wireless communications are described. A user may select a cable modem (CM) at a graphical user interface (GUI) of a network device for testing. The network device may receive the indication of a selected query from GUI and transmit the selected query to the CM. The network device may receive a response message from the CM and compare the response message to an expected response message. The network device may generate a report indicating a status of the CM based on the comparing. The status of the CM may relate to a compliance of the CM to a standard. Additionally or alternatively, the status of the CM may indicate a performance level of the CM.

20 Claims, 10 Drawing Sheets

US 11,770,321 B2

SYSTEMS AND METHODS FOR TESTING WIRELESS MOBILE NETWORK DEVICES

CROSS REFERENCE

This application is a continuation of U.S. patent application Ser. No. 16/413,434, filed May 15, 2019, which application claims the benefit of U.S. Provisional Patent Application No. 62/671,599 by Rupe, et al., entitled "CABLE MODEM VALIDATION," filed May 15, 2018, assigned to the assignee hereof, and expressly incorporated herein by reference in its entirety.

BACKGROUND

A system may be configured to communicate over various networks comprised of various network links, including ethernet, Wi-Fi, Long Term Evolution (LTE), cable (e.g., a fiber optic network). In some cases, communications over the various network links may be based on one or more standards. For example, communications over some communication links may be based on a data over cable service interface specification (DOCSIS).

SUMMARY

A system may include various components communicating with one another over any appropriate network (e.g., ethernet, Wi-Fi, Long Term Evolution (LTE), 3G, 4G, 5G, 6G, a data over cable service interface specification (DOCSIS) network, a fiber optic network (such as but not limited to PON, CPON, EPON, GPON, RFOG, etc.), or any other combination thereof) according to a standard. In some cases, a component may be validated (e.g., for compliance to the standard) prior to deployment in the system. For example, a cable modem (CM) may be configured to communicate according to a DOCSIS specification and the CM may be validated for DOCSIS specification compliance before being deployed for use with the network. A graphical user interface (GUI) at a network device in the system may enable a user to test various aspects of the component for compliance validation.

The network device may transmit a message to the component and monitor for a response. The network device may compare a response from the component to an expected response which may be based on a standard. For example, the network device may transmit a query to a CM communication according to the DOCSIS 3.1 specification. The network device may determine an expected response based on the DOCSIS 3.1 specification and the transmitted query. Upon receiving a response from the CM, the network device may compare the received response to the expected response. If the received response matches portions of the expected response, the network device may determine that the CM is communicating according to the DOCSIS 3.1 specification. Alternatively, if the received response differs at certain portions from the expected response, the network device may determine that the CM is not communicating according to the DOCSIS 3.1 specification. The network device may generate a report indicating the differences and/or similarities between the expected response and the received response.

A method for testing a CM is described. The method may include receiving an indication of a selected query from a plurality of queries for transmission to the CM, and transmitting, by the network, the selected query to the CM based on receiving the indication of the query. The method may further include receiving a response message from the CM based on transmitting the selected query, comparing the received response message to an expected response message, and generating a report indicating a status of the CM based on the comparing.

An apparatus for testing a CM is described. The apparatus may include a processor, memory in electronic communication with the processor, and instructions stored in the memory. The instructions may be executable by the processor to cause the apparatus to receive an indication of a selected query from a plurality of queries for transmission to the CM, transmit, by the network, the selected query to the CM based on receiving the indication of the query, receive a response message from the CM based on transmitting the selected query, compare the received response message to an expected response message, and generate a report indicating a status of the CM based on the comparing.

Another apparatus for testing a CM is described. The apparatus may include means for receiving an indication of a selected query from a plurality of queries for transmission to the CM, means for transmitting, by the network, the selected query to the CM based on receiving the indication of the query, means for receiving a response message from the CM based on transmitting the selected query, means for comparing the received response message to an expected response message, and means for generating a report indicating a status of the CM based on the comparing.

A non-transitory computer-readable medium storing code for testing a CM is described. The code may include instructions executable by a processor to receive an indication of a selected query from a plurality of queries for transmission to the CM, transmit, by the network, the selected query to the CM based on receiving the indication of the query, receive a response message from the CM based on transmitting the selected query, compare the received response message to an expected response message, and generate a report indicating a status of the CM based on the comparing.

Some examples of the method, apparatuses, and non-transitory computer-readable medium described herein may further include operations, features, means, or instructions for identifying one or more parameters associated with the CM, where the expected response message may be based on the identifying.

In some examples of the method, apparatuses, and non-transitory computer-readable medium described herein, the expected response message includes at least one of the one or more parameters.

In some examples of the method, apparatuses, and non-transitory computer-readable medium described herein, the identifying the one or more parameters further may include operations, features, means, or instructions for querying, by the network, a cable modem termination system (CMTS) associated with the CM, the query including a MAC address associated with the CM, and receiving, from the CMTS, the one or more parameters based on the querying, where the one or more parameters may be automatically identified based on the receiving the one or more parameters.

In some examples of the method, apparatuses, and non-transitory computer-readable medium described herein, the one or more parameters include an internet protocol (IP) address, a channel identifier, frequency information, a release indicator, or a combination thereof.

Some examples of the method, apparatuses, and non-transitory computer-readable medium described herein may further include operations, features, means, or instructions for calculating a value based on the received response message, where the expected response message includes the value.

Some examples of the method, apparatuses, and non-transitory computer-readable medium described herein may further include operations, features, means, or instructions for determining that the received response message substantially matches the expected response message, where the status of the CM indicates the determining.

In some examples of the method, apparatuses, and non-transitory computer-readable medium described herein, the expected response message may be based on a DOCSIS specification.

In some examples of the method, apparatuses, and non-transitory computer-readable medium described herein, the status of the CM corresponds to a compliance of the response message with the DOCSIS specification.

Some examples of the method, apparatuses, and non-transitory computer-readable medium described herein may further include operations, features, means, or instructions for receiving a second indication of a second selected query from the plurality of queries, and transmitting the second selected query to the CM, where the report may be based on the selected query and the second selected query.

Some examples of the method, apparatuses, and non-transitory computer-readable medium described herein may further include operations, features, means, or instructions for indicating a noise source for the expected response message, where the comparing may be based on the noise source.

In some examples of the method, apparatuses, and non-transitory computer-readable medium described herein, the response message includes a management information base (MIB) module.

A method for assessing a set of CMs is described. The method may include transmitting a query to the set of CMs, receiving, from one or more of the set of CMs, at least one response to the query, generating a report indicating a status of the one or more of the set of CMs based on the at least one response, and determining a level of performance of the one or more of the set of CMs based on the report.

An apparatus for assessing a set of CMs is described. The apparatus may include a processor, memory in electronic communication with the processor, and instructions stored in the memory. The instructions may be executable by the processor to cause the apparatus to transmit a query to the set of CMs, receive, from one or more of the set of CMs, at least one response to the query, generate a report indicating a status of the one or more of the set of CMs based on the at least one response, and determine a level of performance of the one or more of the set of CMs based on the report.

Another apparatus for assessing a set of CMs is described. The apparatus may include means for transmitting a query to the set of CMs, means for receiving, from one or more of the set of CMs, at least one response to the query, means for generating a report indicating a status of the one or more of the set of CMs based on the at least one response, and means for determining a level of performance of the at least one of the set of CMs based on the report.

A non-transitory computer-readable medium storing code for assessing a set of CMs is described. The code may include instructions executable by a processor to transmit a query to the set of CMs, receive, from one or more of the set of CMs, at least one response to the query, generate a report indicating a status of the one or more of the set of CMs based on the at least one response, and determine a level of performance of the at least one of the set of CMs based on the report.

Some examples of the method, apparatuses, and non-transitory computer-readable medium described herein may further include operations, features, means, or instructions for transmitting the report (e.g., for display at a GUI) where the determining the level of performance may be based on transmitting the report.

Some examples of the method, apparatuses, and non-transitory computer-readable medium described herein may further include operations, features, means, or instructions for identifying one CM of the set of CMs with a level of performance below a threshold level of performance based on the determining the level of performance.

Some examples of the method, apparatuses, and non-transitory computer-readable medium described herein may further include operations, features, means, or instructions for identifying a group of CMs of the set of CMs with a level of performance below a threshold level of performance based on the determining the level of performance.

In some examples of the method, apparatuses, and non-transitory computer-readable medium described herein, the group of CMs may be associated with a same geographical area.

A method for testing a CM for compliance to a DOCSIS specification is described. The method may include identifying one or more parameters associated with the CM, transmitting, by a network, a query to the CM based on the one or more parameters, receiving, from the CM, a MIB module in response to the query, determining an expected MIB module to be received from the CM based on the DOCSIS specification, the one or more parameters, and the received MIB module, and generating a report indicating a compliance of the CM to the DOCSIS specification based on a comparison of the expected MIB module and the received MIB module.

An apparatus for testing a CM for compliance to a DOCSIS specification is described. The apparatus may include a processor, memory in electronic communication with the processor, and instructions stored in the memory. The instructions may be executable by the processor to cause the apparatus to identify one or more parameters associated with the CM, transmit, by a network, a query to the CM based on the one or more parameters, receive, from the CM, a MIB module in response to the query, determine an expected MIB module to be received from the CM based on the DOCSIS specification, the one or more parameters, and the received MIB module, and generate a report indicating a compliance of the CM to the DOCSIS specification based on a comparison of the expected MIB module and the received MIB module.

Another apparatus for testing a CM for compliance to a DOCSIS specification is described. The apparatus may include means for identifying one or more parameters associated with the CM, means for transmitting, by a network, a query to the CM based on the one or more parameters, means for receiving, from the CM, a MIB module in response to the query, means for determining an expected MIB module to be received from the CM based on the DOCSIS specification, the one or more parameters, and the received MIB module, and means for generating a report indicating a compliance of the CM to the DOCSIS specification based on a comparison of the expected MIB module and the received MIB module.

A non-transitory computer-readable medium storing code for testing a CM for compliance to a DOCSIS specification is described. The code may include instructions executable by a processor to identify one or more parameters associated with the CM, transmit, by a network, a query to the CM based on the one or more parameters, receive, from the CM, a MIB module in response to the query, determine an expected MIB module to be received from the CM based on the DOCSIS specification, the one or more parameters, and the received MIB module, and generate a report indicating a compliance of the CM to the DOCSIS specification based on a comparison of the expected MIB module and the received MIB module.

In some examples of the method, apparatuses, and non-transitory computer-readable medium described herein, the expected MIB module corresponds to an MIB module that complies with the DOCSIS specification.

In some examples of the method, apparatuses, and non-transitory computer-readable medium described herein, the identifying the one or more parameters further may include operations, features, means, or instructions for automatically identifying the one or more parameters based on querying a CMTS associated with the CM.

DETAILED DESCRIPTION

Figure 1:
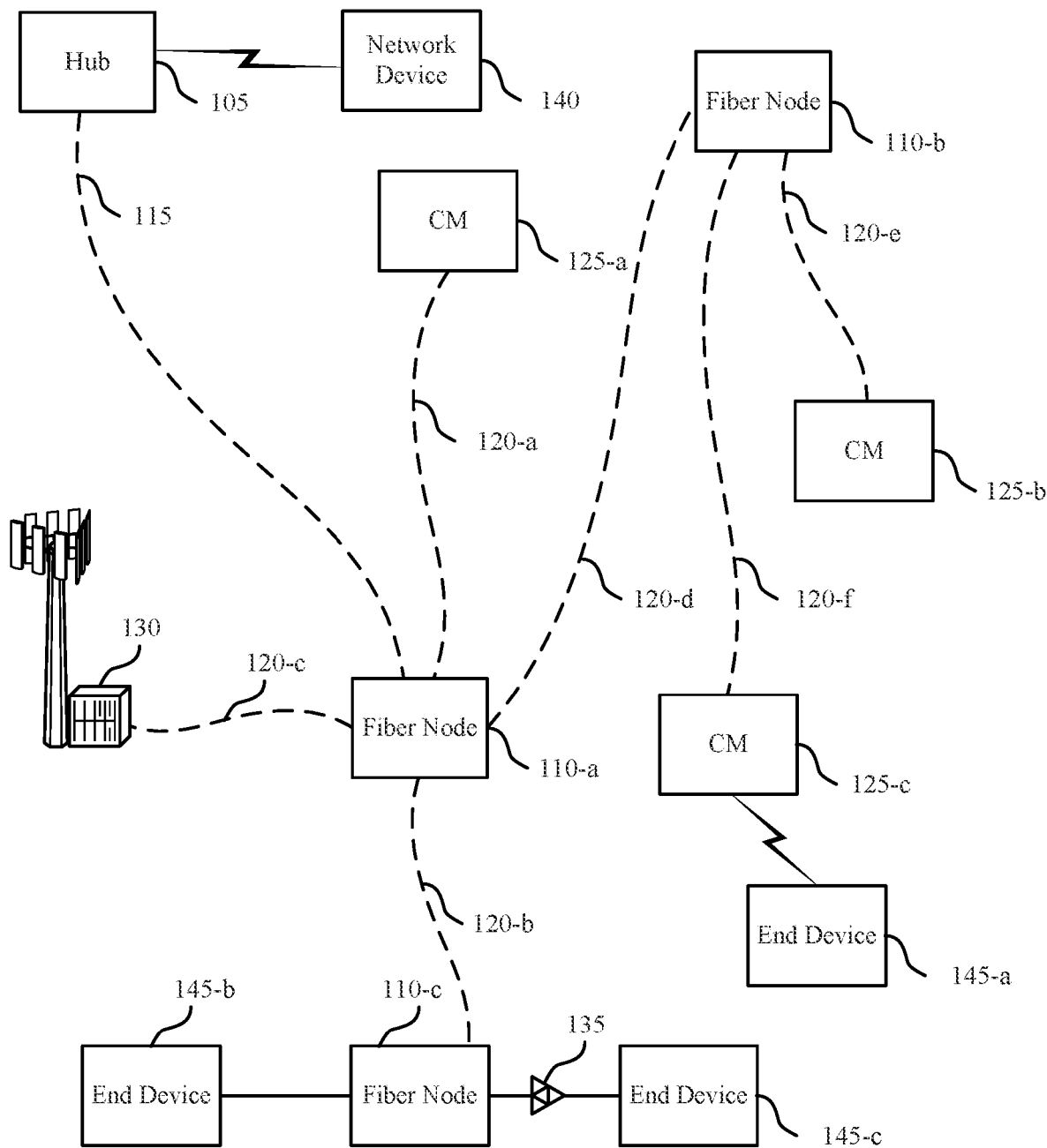
FIG. 1 illustrates a communication system in accordance with the present disclosure.

A system may include various components communicating with one another or with any appropriate network according to a standard. In some cases, a component may be validated (e.g., for compliance to the standard) prior to deployment in the system. For example, a cable modem (CM) may be configured to communicate according to a data over cable service interface specification (DOCSIS). For example, the CM may be configured to report data for proactive network maintenance (PNM). The PNM data may enable operators to detect network errors associated with the CM. Using the PNM data, an operator may determine and address an error associated with the CM in order to minimize a service impact of the error. CMs may be configured to report the PNM data according to a standard, specification (e.g., according to the DOCSIS 3.1 specification), or quality level (e.g., a quality target). In some cases, the standard may specify that a component reports the PNM data by transmitting one or more management information base (MIB) modules.

A common collection framework may collect the reported PNM data from the various network components and present the data to PNM applications. In some cases, a combined collection framework may collect PNM data over a network including different technologies (e.g., optical technologies, Wi-Fi technologies, DOCSIS technologies). For example, a component may report PNM data (e.g., for the DOCSIS specification) by a technology other than cable. That is, the component may report DOCSIS PNM data by Wi-Fi.

The CM may be tested and certified prior to being integrated into a communication system. The certification may indicate that the CM communicates according to the DOCSIS specification. An operator may send a CM to a third party in order to have the CM DOCSIS certified. The third party may perform one or more tests to determine whether the CM communicates according to the DOCSIS specification. For example, the third party may determine if the CM reports PNM data according to the DOCSIS specification. In some cases, the certification process may be extremely expensive. It may therefore be desirable for an operator to perform testing of the CM at the vendor or manufacturing facility prior to sending the CM to the third party for certification testing.

A network device may provide a method for operators to test a CM for compliance to a standard, specification (e.g., according to the DOCSIS 3.1 specification), or quality level target prior to paying a third party for a certification test. The network device may be any device (e.g., a computer, tablet) connected the same network as the CM. In some cases, the network device may include a graphical user interface (GUI) for a user to select a particular CM for testing, select a test, and view a report indicating the test results. For example, the network device may access an application (e.g., by downloading the application, via a browser) including the GUI. Based on input from the user, the network device may query the selected CM. The CM may respond to the query and the network device may compare the received response to an expected response. For example, the CM may transmit some PNM data within the response. The network device may compare the PNM data to a PNM data type and/or format dictated by the DOCSIS specification. The network device may display the results of the test (e.g., indicating the comparison) at a GUI associated with the network device.

The response to the query received by the network device may include one or more MIB modules according to the standard (e.g., the DOCSIS 3.1 specification). Therefore, the network device may determine standard, specification, or quality level target compliance based on receiving the MIB modules. Some standards, specifications, or quality level targets (e.g., DOCSIS specifications prior to DOCSIS 3.1) may not specify that the CM communicates the MIB modules in response to a query. In this case, the network device may not determine compliance based on receiving MIB modules from the CM. For example, a CM may be compliant to the standard, specification, or quality level target without responding with the MIB module. That is, the network device may rely on the standard, specification, or quality level target indicating for CMs to respond to one or more queries with certain MIB modules in order to determine compliance.

This method of testing (by a network device) may enable operators to test and troubleshoot CMs for DOCSIS specification compliance prior to sending the CMs to a third party for certification. Additionally or alternatively, testing by the network device may enable operators to collect data from a pool of CMs (e.g., within a communication system) and compare the results. In some cases, this may enable operators to identify performance issues with one or more CMs within the pool. In some other cases, this may enable operators to validate a testing environment (e.g., the communication system).

Features of the disclosure are initially described in the context of a network and a process flow as described with reference to FIGS. 1 and 2. Features of the disclosure are further described in the context of user interface displays as described with reference to FIGS. 3-5. These and other features of the disclosure are further illustrated by and described with reference to apparatus diagrams and flowcharts that relate to methods for testing cable modems as described with references to FIGS. 7-10.

FIG. 1 illustrates a communication system 100 that supports methods for testing cable modems in accordance with an embodiment of the present disclosure. The communication system 100 may include hub 105, fiber nodes 110, CMs 125, a base station 130, a network device 140, and end devices 145. Hub 105 may be an optical hub 105 that is, for example, a central office, a communications hub, or an optical line terminal (OLT). In the embodiment shown, fiber node 110 is illustrated for use with an optical network, such as but not limited to a passive optical network (PON) and its variants. End devices 145 may be downstream termination units, which can represent, for example, a customer device, customer premises (e.g., an apartment building), a business user, or an optical network unit (ONU). Base station 130 is shown as a larger wireless station, such as a macro cell, but may equally, optionally, or additionally include one or more small cells, micro cells, picocells, femtocell, and other versions of radio heads and remote radio heads including split, virtualized, and virtualized radio units.

Hub 105 may communicate with fiber node 110-*a* by way of optical fiber bundle 115. Optical fiber bundle 115 may be used to communicate both downstream communications to fiber node 110-*a* and upstream communications from fiber node 110-*a* to hub 105. In operation, optical fiber bundle 115 may be typically 30 km or shorter. However, the optical fiber bundle 115 may be longer, such as between 100 km and 1000 km. In some cases, optical fiber bundle 115 may include only a single fiber or a few individual fibers (e.g., six). In an embodiment, fiber node 110-*a* may connect with other devices by optical fibers 120 (e.g., optical fiber 120-*a*, optical fiber 120-*b*, optical fiber 120-*c*, etc.). For example, fiber node 110-*a* may connect with CM 125-*a* by optical fiber 120-*a* and fiber nodes 110-*b* and 110-*c* by optical fibers 120-*d* and 120-*b* respectively. In some cases, fiber node 110-*a* and CM 125-*a* may be integrated as a single device, such as a cable modem termination system (CMTS), which may be located at or near a customer premises. In cases when the fiber node 110-*a* and other devices (e.g., CM 125-*a*, fiber nodes 110-*b*, 110-*c*, base station 130) are separate devices, optical fibers 120 may span distances of approximately 5000 feet or less, although this may vary depending on the network. The communication system 100 may correspond to an optical service domain group. The optical service domain group may correspond to a group of devices routing communications through fiber node 110-*a*.

Fiber node 110-*a* may be configured to multiplex and aggregate services over fiber access networks, such as but not limited to a cable access network and other access networks. For example, fiber node 110-*a* may receive downstream communications and direct the downstream communications by optical fibers 120 to one or more of the devices (e.g., CMs 125, fiber nodes 110, base station 130, end devices 145). The downstream communications may carry DOCSIS channels, digital video, analog video channels, channels with telemetry information, set top box control channels, internet protocol (IP) protocol data, over-the-top data, telephony channels, and any other data that may be carried over digital and analog networks. In another example, communication system 100 may include EPON services, radio frequency over glass (RFOG) services, in combination with other services.

Fiber node 110-*a* may receive and aggregate upstream communications from CM 125-*a*, fiber nodes 110-*b*, or base station 130. The upstream communications may include DOCSIS channels, set top box return channels, upstream telemetry, and telephony channels. The upstream communications may also include ethernet passive optical network (EPON), Gigabit PON, RFOG, and Gigabit Ethernet. In some cases, the channels may be multiplexed and a wideband composite signal may be used to intensity modulate an optical carrier (e.g., by an CM 125). The fiber node 110-*a* may combine the upstream signals and communicate them to hub 105. Fiber node 110-*a* may direct communications to other fiber nodes 110. For example, the fiber node 110-*a* may receive downstream communications from hub 105 and direct the communications to other fiber nodes 110 (e.g., fiber nodes 110-*b* and 110-*c*). Here, the receiving fiber nodes 110-*b* and 110-*c* may in turn receive the downstream communications from fiber node 110-*a* and direct the communications accordingly. For example, fiber node 110-*b* may receive downstream communications from fiber node 110-*a* and direct the communications to CMs 125-*b* and 125-*c* by fibers 120-*e* and 120-*f*. Further, fiber node 110-*b* may receive and aggregate upstream communications from CMs 125-*b* and 125-*c* and fiber node 110-*b* may direct the upstream communications to fiber node 110-*a*. In some examples, CMs 125 may be located at homes, businesses, and so forth.

The communication system 100 may be or may include a hybrid fiber-coaxial (HFC) network. An HFC network may include both optical fibers 120 and coaxial cables. In a case when communication system 100 includes coaxial cables, fiber nodes 110 may receive and direct communications by optical fibers and coaxial cables. For example, fiber node 110-*c* may receive downstream communications from fiber node 110-*a* by optical fiber 120-*b* and direct the downstream communications by coaxial cables to CMs 125-*d* and 125-*e*. The communication system 100 may include one or more radio frequency (RF) amplifiers 135. The RF amplifiers 135 may be used to amplify signals being communicated by a coaxial cable. For example, RF amplifier 135 may be used to amplify a signal between fiber node 110-*c* and end device 145-*c*. In some cases, a number or placement of RF amplifiers 135 may be based on a number of factors such as a length of coaxial cable, a type of signal being communicated on the coaxial cable, or an amount of noise associated with the signals being communicated on the coaxial cable.

Fiber node 110-*a* may be configured to direct communications for multiple industries. That is, fiber node 110-*a* may direct optical communications as well as wireless communications. For example, communication system 100 may be used for point-to-point optical link based services, such as Gigabit Ethernet (e.g., used to support business services). In another example, fiber node 110-*a* may connect base station 130 to a backhaul network (e.g., establish a wired communication between the base station 130 and the hub 105) by optical fiber 120-*c*. Alternatively, fiber node 110-*a* may connect base station 130 to a fronthaul, mid-haul or x-haul network, depending on the network configuration and/or coupling. Base station 130 has been included for explanatory purposes only and communication system 100 may include one or more base stations 130 or no base stations.

CMs 125 may be configured to report data (e.g., to the hub 105) for PNM. The PNM data may enable operators to detect network errors associated with a CM 125. For example, the CM 125-*a* may report PNM data that indicates an error at the CM 125-*a*. Using this information, an operator may determine and address the error in order to minimize a service impact of the error. The CMs 125 may be configured to report the data according to a standard, specification (e.g., according to a DOCSIS specification), or quality level. Although not shown, other components within the communication system 100 may also be configured to report data for PNM. For example, a CMTS within the communication system 100 may also report PNM data.

A component may be tested and certified prior to being integrated into communication system 100. For example, a CM 125 may be tested and certified prior to being integrated into communication system 100. Additionally or alternatively, some other components of wireless communication system 100 may be tested and certified prior to being integrated into communication system 100. The certification may indicate that the CM 125 communicates according to the DOCSIS specification. An operator may send a CM 125 to a third party in order to have the CM 125 DOCSIS certified. The third party may perform one or more tests to determine whether the CM 125 is communicating according to the DOCSIS specification. For example, the third party may determine whether the CM 125 reports PNM data according to the DOCSIS specification. In some cases, the certification process may be expensive. Further, an operator may send a CM 125 to the third party for certification testing and fail the certification test. The third party may not provide adequate information indicating a problem associated with the CM 125 preventing certification. As a result, the operator may undergo expensive and time consuming iterations including sending the CM 125 to the third party for certification, trouble-shooting the CM 125, and sending the CM 125 to the third party for certification again.

It may be desirable for an operator to perform testing of the CM 125 prior to sending the CM 125 to the third party for certification testing. The network device 140 may provide a method for operators to test a CM 125 for compliance to a standard, specification (e.g., according to the DOCSIS 3.1 specification), or quality level target prior to paying a third party for a certification test. The network device 140 may be any device (e.g., a computer, tablet) connected to the hub 105. In some cases, the network device 140 may be in communication with hub 105 directly. Additionally or alternatively, the network device 140 may be in communication with the hub 105 indirectly (e.g., by one or more of a fiber node 110, base station 130, CM 125). The network device 140 may be at a same location as the CM 125. Additionally or alternatively, the network device 140 may be at a different location than the CM 125.

The network device 140 may include a GUI for a user to select a CM 125 for testing, select a test, and view the test results. For example, the network device 140 may access an application (e.g., by downloading the application, via a browser) including the GUI. The application may be a cable modem validation application (CMVA). The CMVA may support the physical layer (PHY) and operations support system interface (OSSI). Based on input from the user, the network device 140 may query the selected CM 125. The CM 125 may respond to the query and the network device 140 may compare the received response to an expected response. For example, the CM 125 may transmit some PNM data within the response. The network device 140 may compare the PNM data to the PNM data reporting dictated by the DOCSIS specification. The network device 140 may display the results of the test (e.g., indicating the comparison) at a GUI associated with the network device 140. In some cases, the network device 140 may be working in real time with the CM 125. Additionally or alternatively, the network device 140 may not be working in real time with the CM 125.

Testing by the network device 140 may enable operators to test and troubleshoot CMs 125 for DOCSIS compliance prior to sending the CMs 125 to a third party for certification. Additionally or alternatively, testing by the network device 140 may enable operators to collect data from a pool of CMs 125 (e.g., within a communications system) and compare the results. In some cases, this may enable operators to identify performance issues with one or more CMs 125 within the pool. In some other cases, this may enable operators to validate a testing environment (e.g., the communication system).

Figure 2:
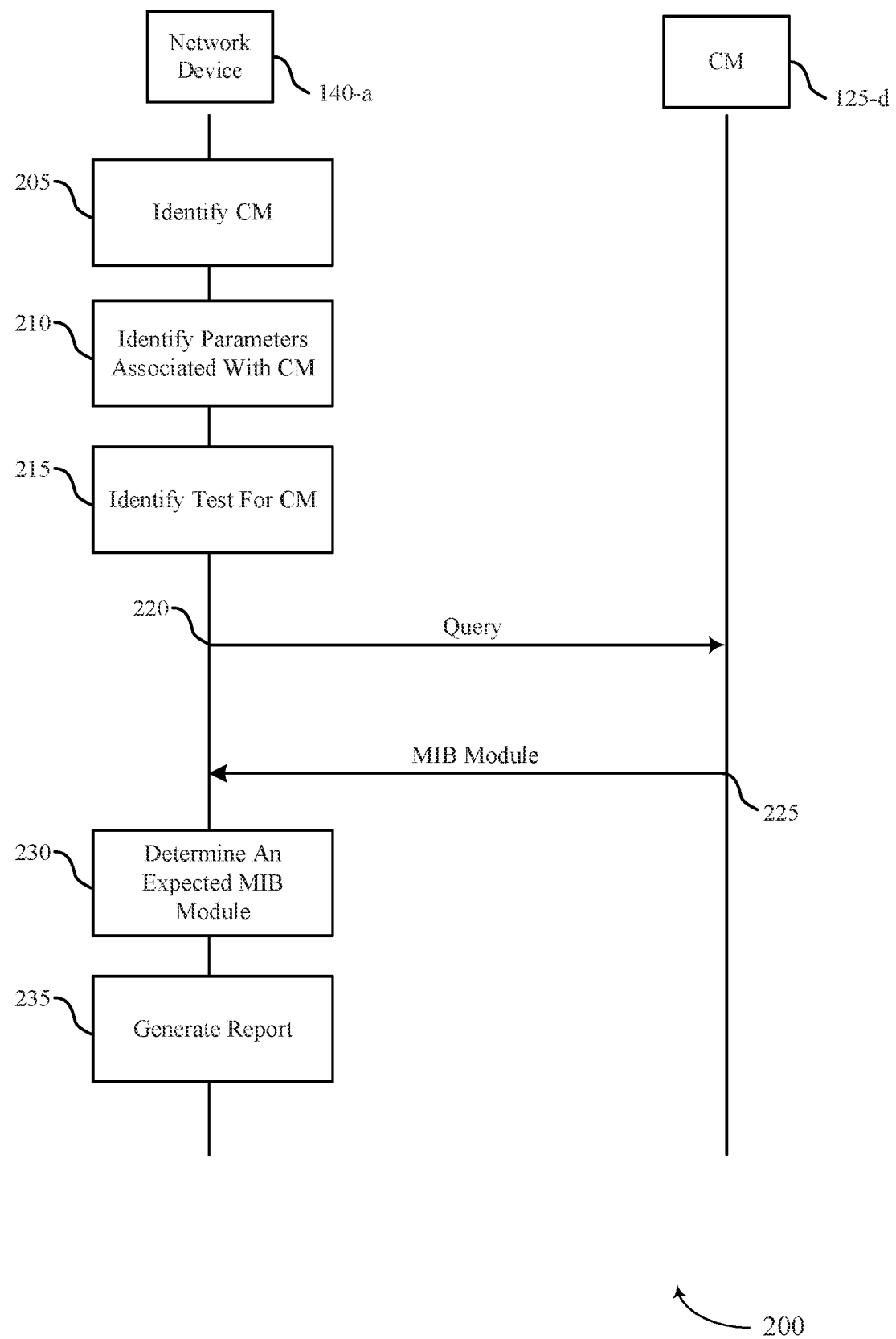
FIG. 2 illustrates a process flow in accordance with the present disclosure.

FIG. 2 illustrates an example of a process flow 200 that supports methods for testing cable modems in accordance with aspects of the present disclosure. The process flow 200 may include operations performed by a network device 140-*a*, which may be an example of a network device as described with reference to FIG. 1. The process flow may further include operations performed by a CM 125-*d* which may be an example of a CM as described with reference to FIG. 1.

At 205, the network device 140-*a* may identify the CM 125-*d* for testing. In some cases, the network device 140-*a* may receive user input indicating the CM 125-*d* for testing. For example, a user may select CM 125-*d* from a list of CMs 125 at a GUI associated with the network device 140-*a*. In some cases, the network device 140-*a* may generate a list of CMs 125 for testing by determining a list of CMs 125 in communication with a same hub (e.g., as described with reference to FIG. 1) as network device 140-*a*. A user may select more than one CM 125 to test. Here, the CMs 125 may be tested sequentially or in parallel (e.g., during a same period of time).

At 210, the network device 140-*a* may identify parameters associated with CM 125-*d*. In some cases, the network device 140-*a* may automatically identify the parameters associated with the CM 125-*d* based on identifying the CM 125-*d* for testing. For example, the network device 140-*a* may transmit a query to a CMTS associated with the CM 125-*d* and receive a response. The query may include a media access control (MAC) address of the CM 125-*d*. The response may include an indication of some or all of the parameters associated with the CM 125-*d*. For example, the response message may include a discovery MIB module including the parameters. Additionally or alternatively, the network device 140-*a* may identify the parameters associated with CM 125-*d* by receiving an indication of the parameters from a user (e.g., by the GUI). In some cases, the network device 140-*a* may verify parameters received by the GUI according to the parameters indicated by a discovery MIB module from CM 125-*d*.

The parameters may include, for example, a MAC address for the CM 125-*d*, an IP address for the CM 125-*d*, channel identifiers, frequency information, a release indicator. The channel identifiers may include a downstream orthogonal frequency-division multiplexing (OFDMA) channel identifier, an upstream orthogonal frequency-division multiple access (OFDMA) channel identifier, or a downstream quadrature amplitude modulation (QAM) channel identifier. The frequency information may include the downstream subcarrier zero frequency for the CM 125-*d*, the downstream spacing, the downstream first active subcarrier index, the number of downstream profiles, the upstream spacing, the upstream subcarrier zero frequency, the upstream first active subcarrier index, the first segment center frequency, the last segment center frequency, the segment frequency span, or a number of bins per segment. The release indicator may include a major version information and minor version information.

At 215, the network device 140-*a* may identify one or more tests for the CM 125-*d*. There may be a list of more than one test displayed at the GUI of the network device 140-*a*. The network device 140-*a* may receive an indication of a test selected by the user. In some cases, a single test may correspond to evaluating the contents of a response to a single query. For example, if the network device 140-*a* transmits a query to the CM 125-*d*, the CM 125-*d* may respond with a MIB module. Each test may evaluate the format and contents of the MIB module. Additionally or alternatively, a single test may evaluate more than one response message (e.g., more than one MIB module). In some cases, the network device 140-*a* may identify more than one test for the CM 125-*d*. That is, a user may have selected more than one test to run on the CM 125-*d*. The network device 140-*a* may run the selected tests sequentially.

At 220, the network device 140-*a* may transmit a query to the CM 125-*d*. In a case that the network device 140-*a* identified more than one test, the network device 140-*a* may transmit more than one query. In some cases, the network device 140-*a* may transmit the queries sequentially. Additionally or alternatively, if the network device 140-*a* identified more than one CM 125 to test, the network device 140-*a* may test the multiple CMs 125 in parallel. The network device 140-*a* may transmit a query to each of the CMs 125-*d* at a same time.

At 225, the CM 125-*d* may respond to the query. The CM 125-*d* may respond with a response message based on the transmitted query. For example, if the network device 140-*a* transmitted a query requesting a specific MIB module, the response message may include the requested MIB module. The CM 125-*d* may transmit the response message by various technologies. for example, the CM 125-*d* may transmit the response message (e.g., containing DOCSIS PNM data) by a Wi-Fi technology. Additionally or alternatively, the CM 125-*d* may transmit the response message by a cable technology. In some cases, a standard may indicate for the CM 125-*d* to respond to the query with the MIB module. In some other cases, (e.g., in a case of a DOCSIS standard prior to DOCSIS 3.1) a standard may not specify that the CM 125-*d* respond with the specific MIB module. In this case, the network device 140-*a* may not determine compliance based on receiving MIB modules from the CM 125-*d*. For example, the CM 125-*d* may be compliant to the standard without responding with the MIB module. Therefore, the network device 140-*a* may rely on the standard indicating for the CM 125-*d* to respond with the MIB module in order to determine compliance.

At 230, the network device 140-*a* may determine an expected response message from the CM 125-*d*. The expected response message may be based on the parameters associated with CM 125-*d*, the query transmitted from the network device 140-*a*, and the DOCSIS specification. For example, the DOCSIS specification may outline the type of information (e.g., which PNM data, which MIB module) the response message should contain based on the query. In some cases, the DOCSIS specification may specify that the response message includes an indication of the major version and minor version associated with the CM 125-*d*. Here, the expected response message may be based on the parameters (e.g., the major and minor versions of the CM 125-*d*) identified at 210.

In some other cases, the expected response message may be based on a noise source selected by the network device 140-*a*. For example, the network device 140-*a* may automatically determine an amount of predicted noise associated with the response to the query. The amount of predicted noise may be based on a condition of the communication links between the network device 140-*a* and the CM 125-*d* (e.g., an optical fiber link, a coaxial cable link, a wireless communication link). In some instances, the expected response message may include an indication of the noise source selected by the network device 140-*a*. In some other instances, the expected response message may be adjusted based on the noise source.

In some cases, the expected response message may include requirements for the received response message. That is, the DOCSIS specification may specify a minimum received power level, a maximum noise, or other numerical parameters related to the received response message. Therefore, the expected response message may abide by the parameters dictated by the DOCSIS specification.

At 235, the network device 140-*a* may generate a report. The report may indicate a status of the CM 125-*d*. The status of the CM 125-*d* may relate to a determined compliance with the DOCSIS specification. For example, if the received MIB module includes the PNM data specified by the DOCSIS specification (and in a format specified by the DOCSIS specification), the network device 140-*a* may determine that the status of the CM 125-*d* corresponds to a compliance with the DOCSIS specification. Alternatively, if the received MIB module does not include the PNM data specified by the DOCSIS specification (or does not include the PNM data in a correct format as specified by the DOCSIS specification), the network device 140-*a* may determine that the status of the CM 125-*d* is not in compliance with the DOCSIS specification.

The network device 140-*a* may determine the status of the CM 125-*d* by comparing the received response message to the expected response message. Based on the similarity (or difference) between the two, the network device 140-*a* may determine whether the CM 125-*d* complies (according to the test) with the DOCSIS specification.

The report may include information for display at the GUI associated with network device 140-*a*. The information for display may allow a user to review the report and determine specific requirements (e.g., indicated by the DOCSIS specification) that the CM 125-*d* is meeting or, alternatively, failing to meet. The report may further include additional data that may be used for other troubleshooting of the CM 125-*d*.

The report may provide a method for troubleshooting a system including the CM 125-*d*. For example, the CM 125-*d* may be deployed (and providing service to a customer) in a communications system. A vendor may determine an impairment in the system that may not be associated with vendor equipment. In order to diagnose the impairment, the vendor may invest in proprietary hardware. This may be expensive and time consuming. Alternatively, the vendor may utilize the network device 140-*a* to troubleshoot other components within the system (such as CM 125-*d*).

A report generated by the network device 140-*a* may indicate a level of performance of CM 125-*d*. For example, the report may indicate a noise level associated with the CM 125-*d*. The vendor may determine that the impairment in the system is associated with the CM 125-*d* if the noise level associated with the CM 125-*d* is greater than a threshold level. In some cases, the vendor may run a test on multiple CMs 125 within a system experiencing with the impairment. Based on the generated reports, the vendor may determine a CM 125 with a level of performance below a certain threshold. In some cases, the report may indicate a geographical area associated with a performance below the threshold. For example, the report may indicate that the system-wide performance problem stems from one or more CMs 125 within the indicated geographical area.

The report generated by the network device 140-*a* may indicate a status of the testing environment (e.g., a communication system including a tested component). Here, the network device 140-*a* may identify a component within the testing environment, identify a test for the component, and transmit a query to the component. The component may be a CM (e.g., CM 125-*d*). Additionally or alternatively, the component may be some other component within the testing environment that may or may not be compliant (e.g., to a standard, specification, or quality level target). For example, the component may be an end device, a fiber node, or a CMTS. In some cases, the component may be expected to perform at a given level (e.g., based on previous testing, other historical data, a performance of a similar component in another system). The given level (e.g., at which the component is expected to perform) may enable the network device 140-*a* to determine an expected response and generate the report based on a comparison between the expected response and a response received from the component. Based on the performance of the component within the testing environment, the report may indicate a status of the testing environment itself. This may enable operators to test and troubleshoot a communication system.

Figure 3:
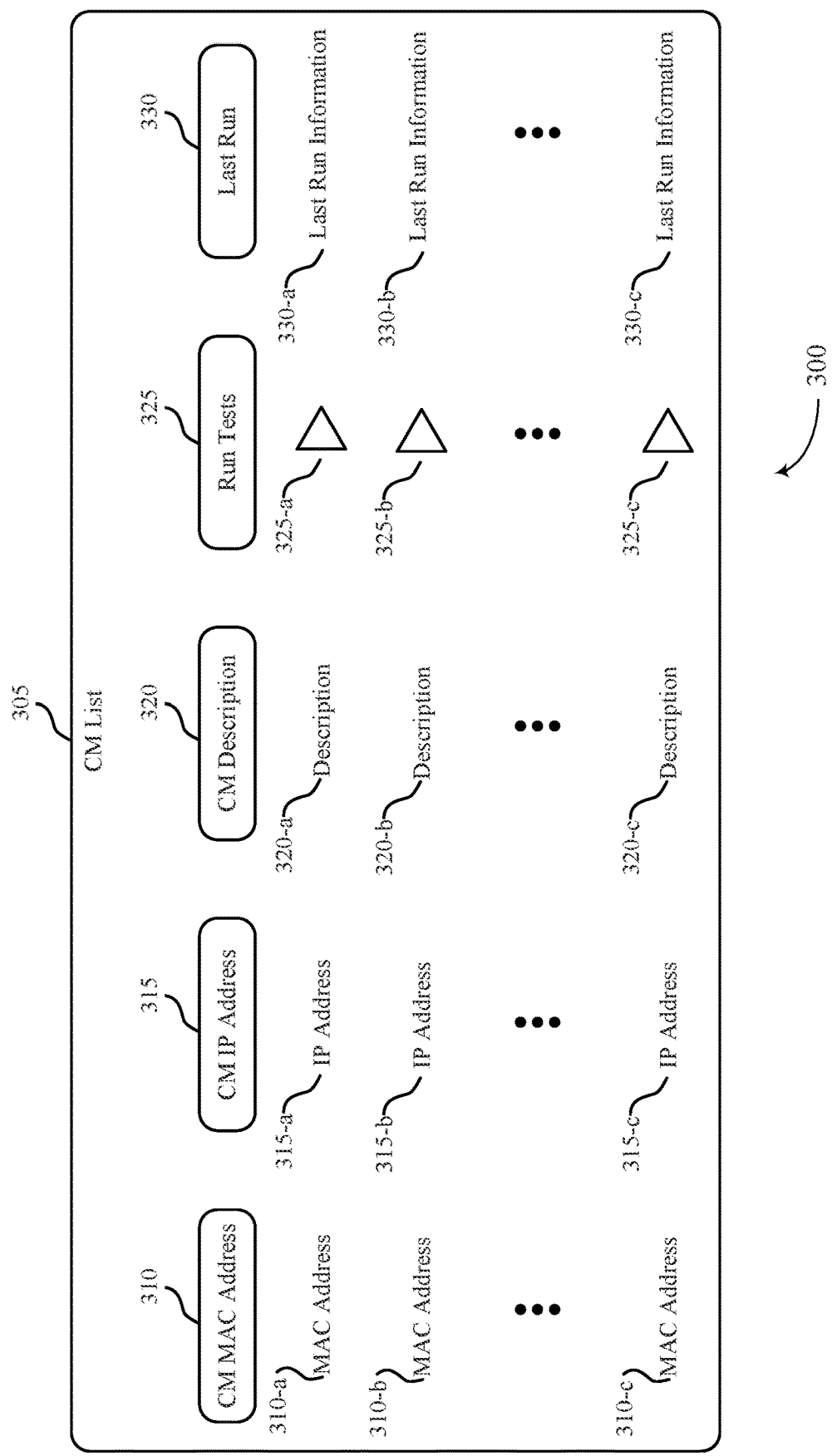
FIGS. 3 through 5 illustrate user interfaces in accordance with the present disclosure.

FIG. 3 illustrates an example of a user interface display 300 that supports methods for testing cable modems in accordance with aspects of the present disclosure. In some examples, user interface display 300 may implement aspects of communication system 100 process and process flow 200. For example, the user interface display 300 may be a GUI associated with a network device as described with reference to FIGS. 1 and 2.

The user interface display 300 may enable a user to interact with the network device. For example, the user interface may enable a user to select a component (e.g., a CM, a CMTS, a fiber node, an end device) for testing. A user may select a CM for testing in order to determine a compliance of the CM to a standard such as the DOCSIS 3.1 specification. In another example, a user may select one or more CMs for testing in order to diagnose an impairment within a system. For example, the user may be associated with a vendor that is not associated with the one or more CMs. Here, the user may select the CMs in order to diagnose a CM associated with the impairment. In some other examples, a user may select a component (e.g., a CM or other component) with an expected performance level within a communication system. The user may select the component in order to test the communication system (e.g., based on a comparison between the expected performance of the component and the actual performance of the component within the communication system).

User interface display 300 may display a CM List 305. The CM list 305 may include a list of CMs (e.g., as described with reference to FIGS. 1 and 2) available for testing at the network device. In some cases, the network device may generate the list of available CMs for testing automatically. For example, the network device may transmit queries to one or more CMTSs within the network to identify CMs available for testing. A user may select a CM for testing from the CM list 305. The network device may identify the CM for testing based on receiving an indication of the selected CM from the user interface display 300.

The CM list 305 may include a list of CMs and corresponding information related to the CMs. For example, the CM list 305 may display a CM MAC Address 310, a CM IP Address 315, a CM description 320, a run test 325 icon, and a last run 330.

The CM MAC Addresses 310 may display the MAC Addresses 310-*a*, 310-*b*, and 310-*c* of each identified CM. The CM IP Addresses 315 may display the IP Addresses 315-*a*, 315-*b*, and 315-*c* of each identified CM. The CM Descriptions 320 may display additional descriptions 320-*a*, 320-*b*, and 320-*c* about the identified CM. For example, the descriptions may include information about a vendor (e.g., an operator) associated with the identified CM, an indication of one or more parameters associated with the CM (e.g., versions of the CM), and an indication of a model of the CM.

The run test 325 icon may include a button 325-*a*, 325-*b*, or 325-*c* to initiate a test run for the associated CM. In some cases, the buttons 325-*a*, 325-*b*, or 325-*c* may initiate an automated comprehensive test of the CM (e.g., indicate to the network device to run all of the available tests sequentially). In some other cases, the buttons 325-*a*, 325-*b*, or 325-*c* may cause the network device to display the user interface display 400 as described with reference to FIG. 4.

The last run 330 may include last run information 330-*a*, 330-*b*, and 330-*c*. The last run information 330-*a*, 330-*b*, and 330-*c* may indicate a date and/or time of a last test run on the CM. Further, the last run information 330-*a*, 330-*b*, and 330-*c* may include a button to allow a user to switch to a new display to view a report generated by the last test run on the CM.

In some cases, the CM list 305 may further include a button for a user to indicate for the CM to be reset. The network device may receive an indication by the user interface display (e.g., the GUI) and communicate to the CM to reset. Thus, an operator may remotely reset the CM by user interface display 300.

Figure 4:
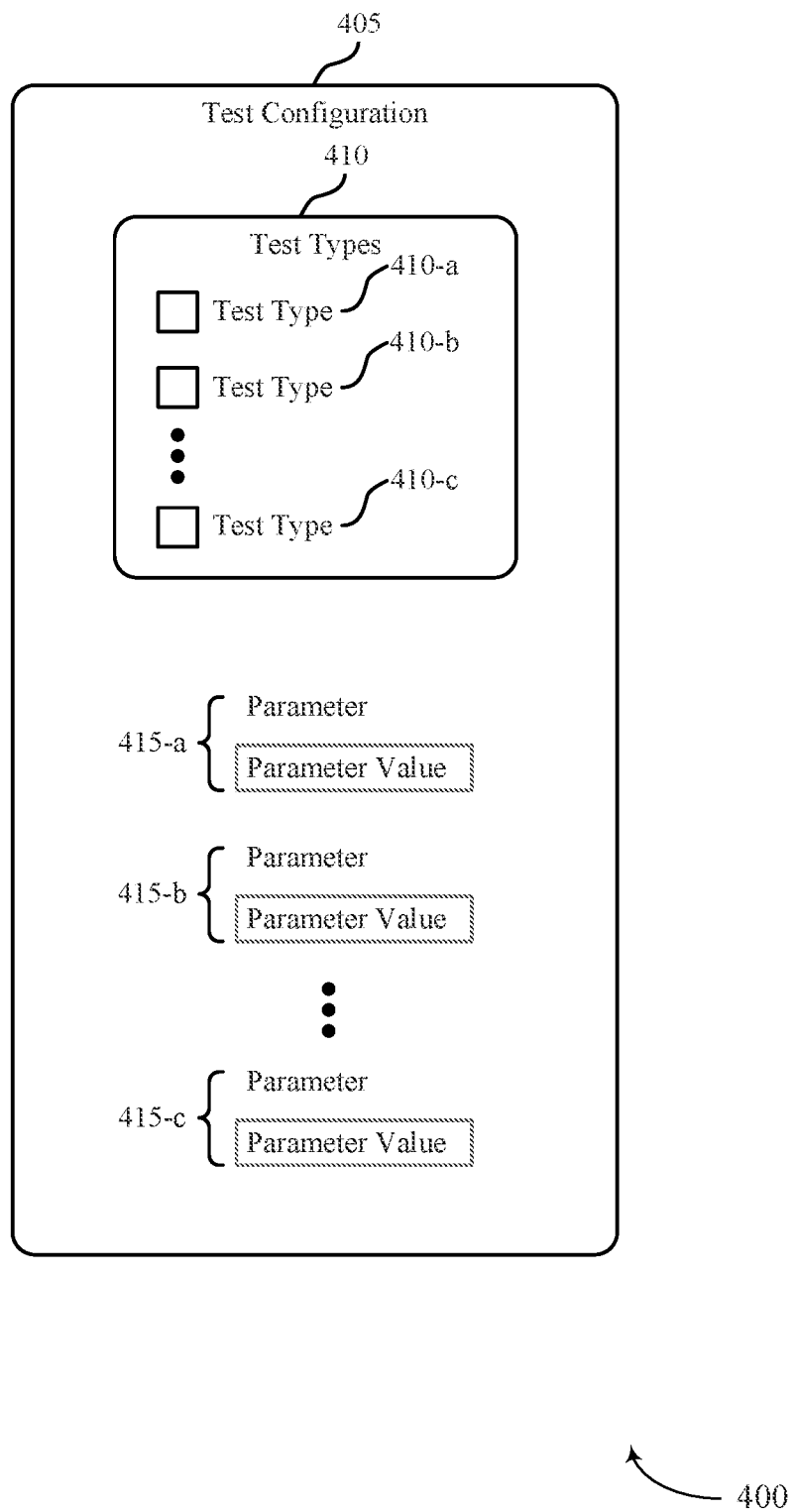

FIG. 4 illustrates an example of a user interface display 400 that supports methods for testing cable modems in accordance with aspects of the present disclosure. In some examples, user interface display 400 may implement aspects of communication system 100 process and process flow 200. For example, the user interface display 400 may be a GUI associated with a network device as described with reference to FIGS. 1 and 2. In some cases, the GUI may display user interface display 400 at a same time as displaying user interface display 300. Alternatively, the GUI may display user interface display 400 after the user selects a CM by user interface display 400.

The user interface display 400 may display a test configuration 405. The test configuration 405 may include a list of test types 410 as well as an indication of the parameters 415 associated with the selected component (e.g., a CM or other component type). The list of test types 410 may display a list of the different test types 410-*a*, 410-*b*, and 410-*c*. A user may select a box to the left of the test type 410 to run the test indicated by the test type 410. If a user selects the one or more tests 410, the network device may determine to run the selected tests and automatically transmit a corresponding query to the selected component.

The different test types 410 may correspond to different queries to be transmitted by the network device and, as a result, different MIB modules received in response. Additionally or alternatively, the different test types 410 may correspond to testing or verifying different types of PNM data. For example, test type 410-*a* may be downstream modulation error ration (MER) test type 410-*a* (e.g., a PNMDsRxMER test type 410-*a*). The test type 410-*a* may test a capability of a selected component (e.g., a selected CM, a different selected component in a communication system) to calculate and upload downstream receive MERs for each sub-carrier in the OFDM channel The test type 410-*a* may determine a stability of the capability and whether the selected component uploads the downstream receive MERs according to a format defined by the specification. In some cases, the test type 410-*a* may validate a capability of the component to calculate one or more of the average MER values across active sub-carriers, the percentile values from the MER values of the active sub-carriers, or the standard deviations from the MER values of active sub-carriers.

Test type 410-*b* may be a forward error correction (FEC) test type 410-*b* (e.g., a PNMFecSum test type 410-*b*). The test type 410-*b* may test a capability of a selected component to calculate and upload downstream FEC errors for the OFDM. The test type 410-*b* may determine a stability of the capability and whether the selected component uploads the downstream FEC errors according to a format defined by the specification.

The test type 410-*c* may be a downstream channel estimate test type 410-*c* (e.g., a PNMDsChEst test type 410-*c*). The test type 410-*c* may test a capability of a selected component to calculate and upload downstream channel estimate coefficients for each sub-carrier in the OFDM channel. The test type 410-*c* may determine a stability of the capability and whether the selected component uploads the downstream channel estimate coefficients according to a format defined by the specification. The downstream channel estimate test type 410-*c* may validate a capability of the selected component to calculate (e.g., from the channel estimation data) one or more of a tilt per megahertz, a peak to peak ripple, a group delay, a group delay tilt, or mean values.

The test types 410 may include additional test types. For example, there may be a downstream constellation display test type 410 (e.g., a PNMConDisp test type 410). The downstream constellation display test type 410 may test a capability of a selected component to calculate and upload downstream constellation display data from symbols carried by sub-carriers that are on a specific modulation order in the OFDM channel. The downstream constellation display test type 410 may validate a capability of the selected component to scale an average power of the QAM constellation to approximately one. In some instances, scaling the average power of the QAM constellation to one may be dependent on the QAM symbols being equally probably and not including pilots.

The parameters 415 may include a list of parameters associated with the selected component (e.g., a CM, a different type of selected component). The parameters 415 may include an indication of the parameter (e.g., Parameter) and a value associated with the parameter (e.g., parameter value). For example, parameter 415-*a* may be a downstream OFDM channel identifier, and the parameter value (e.g., for the selected component) may be 159. In another example, the parameter 415-*b* may indicate a downstream spacing in kilohertz (kHz). The parameter value for the selected component may be 50. In another example, a third parameter 415-*c* may be a downstream OFDM modulation type. The parameter value for the selected component may be 7.

The parameters may additionally include, for example, a MAC address for a selected CM, an IP address for the selected CM, channel identifiers, frequency information, and/or a release indicator. The channel identifiers may include an upstream OFDMA channel identifier, or a downstream QAM channel identifier. The frequency information may include the downstream subcarrier zero frequency for the selected CM, the downstream spacing, the downstream first active subcarrier index, the number of downstream profiles, the upstream spacing, the upstream subcarrier zero frequency, the upstream first active subcarrier index, the first segment center frequency, the last segment center frequency, the segment frequency span, and/or a number of bins per segment. The release indicator may include a major version information and minor version information.

In some cases, the user interface display 400 may enable a user to manually input the parameter values for the selected component. Based on the input parameters, the network device may determine the parameters associated with the selected component. Additionally or alternatively, the network device may populate the parameter value field for some or all of the parameters 415. For example, when the network device receives an indication of a selected CM (e.g., by the user interface display 300 as discussed with reference to FIG. 3), the network device may transmit a query to a CMTS associated with the selected CM. The CMTS may respond with a message indicating the parameters for the selected CM. For example, the CMTS may transmit a discovery MIB module to the network device, where the discovery MIB includes the parameters for the CM. In some cases, the user may enter parameter values for the parameters 415 and the network device may verify the entered parameters (e.g., by querying the CMTS). If the network device determines that the user-entered parameters match the parameters determined by the network device (e.g., by querying a CMTS), the network device may use the user-entered parameters for subsequent tests of the CM. Alternatively, if the network device determines that the user-entered parameters do not match the parameters determined by the network device, the network device may indicate a discrepancy to the user (e.g., by user interface display 400).

Figure 5:
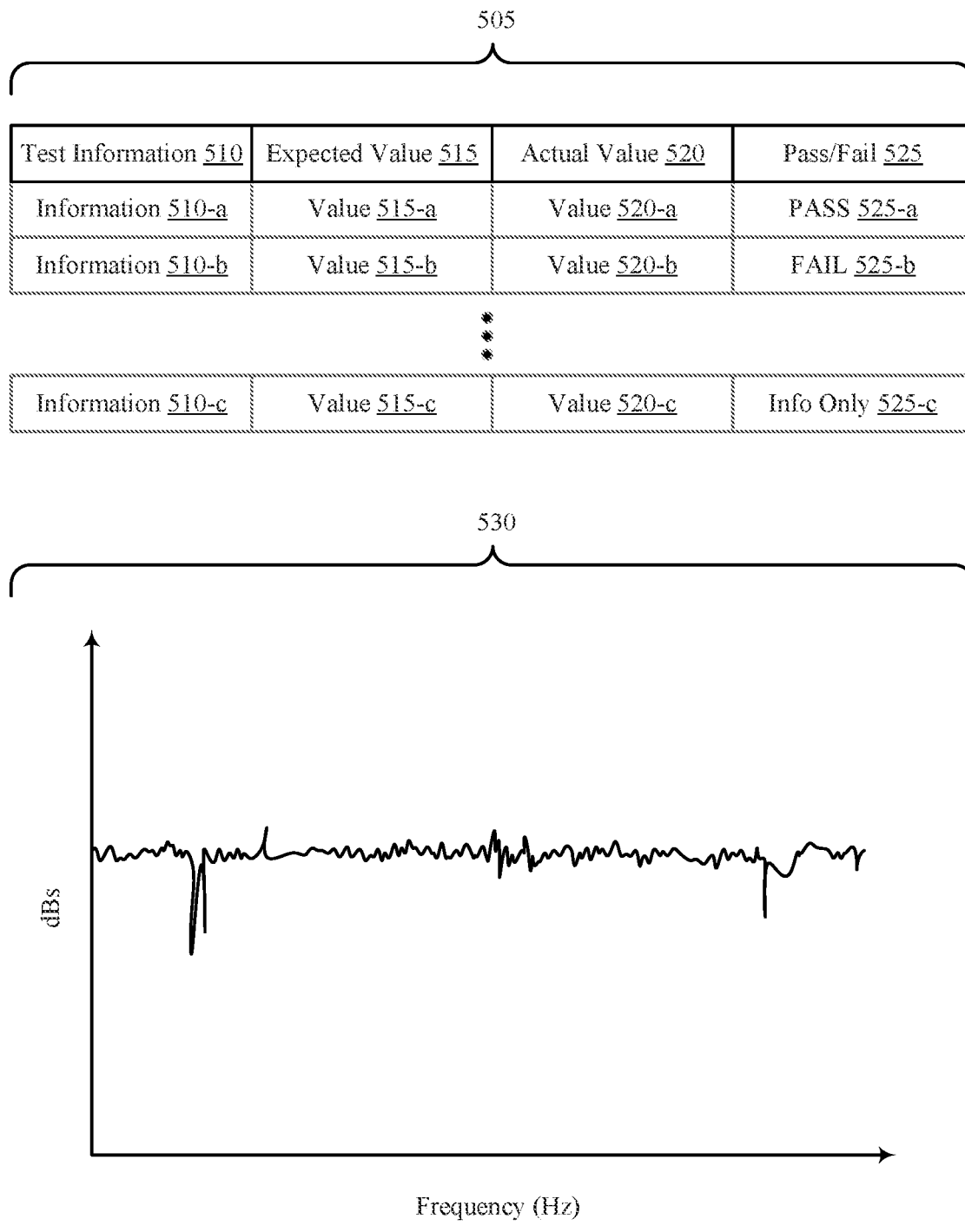

FIG. 5 illustrates an example of a user interface display 500 that supports methods for testing cable modems in accordance with aspects of the present disclosure. In some examples, user interface display 500 may implement aspects of communication system 100 process and process flow 200. For example, the user interface display 500 may be a GUI associated with a network device as described with reference to FIGS. 1 and 2. In some cases, the GUI may display user interface display 500 at a same time as displaying user interface display 300, 400, or both. Alternatively, the GUI may display user interface display 500 after the user selects "Run Tests" or "Last Run" of the user interface display 300 as described with reference to FIG. 3.

The user interface display 500 may display a report indicating the status of the selected component. The network device may compare a received MIB module to an expected MIB module and generate a report for display at the user interface display 500 indicating the difference (or similarity) between the two. The report may include a table 505 and a graph 530. Although not shown, the user interface display 500 may further include a display of the testing log files. In some cases, the user interface display 500 may include a link for a user to download or view the testing log files in another display window. The test log files may include the raw test files and test reports for vendor debugging references. The test logs may be downloaded in raw text and may form a portable hypertext markup language (HTML) test report in a single archive.

The table 505 may include an indication of the information evaluated by the network device to determine compliance to the DOCSIS specification. For example, the test information 510 may indicate the information that was evaluated. In some cases, the information may correspond to a header field (e.g., within the MIB module), or a target piece of information reported within the MIB module. The expected value 515 may include a value that was expected (e.g., based on the DOCSIS specification, the parameters associated with the selected component, the test selected), the actual value 520 (e.g., received by the network device in a MIB module), and an indication of whether the actual value 520 complies with the DOCSIS specification.

For example, the information 510-a may be the downlink channel identifier. Based on the parameters identified for the selected component (e.g., a selected CM), the value 515-a expected for the information 510-a may be 159. In some cases, the actual value 520-a of the downlink channel identifier may be 159. Here, the pass/fail information 525 may indicate a PASS 525-a. Alternatively, if the actual value 520-a was different than the expected value (e.g., value 515-a), the pass/fail 525 may indicate a FAIL.

In another example, the information 510-b may correspond to the major version of a selected CM. Here, the expected value, value 515-a may be 1. However, the actual value, value 520-b, may be 0. Here, the pass/fail information 525 may indicate a FAIL 525-b. That is, the network device may compare the value 515-b and the value 520-b and determine that the expected value and actual value do not match. Therefore, the CM failed to report the PNM data according to the DOCSIS specification.

In another example, the information 510-c may indicate a number of active subcarriers associated with the selected component (e.g. a CM). Here, the expected value 515-c may not be a specific value, but rather a check to determine if the component reports the number of active subcarriers. Here, if the value 520-a contains any indication of a number of active subcarriers (even if the number is incorrect), the network device may determine that the information was provided, and indicate "Info Only" at 525-c, thus indicating a compliance with the DOCSIS specification.

The graph 530 may indicate a frequency response of the response message received from the selected component. In some cases, the graph 530 may not directly indicate a compliance with the DOCSIS specification. However, the graph 530 may provide additional information about the selected component (e.g., a CM). In some cases, the graph 530 may enable a user to determine whether the selected component is performing above a threshold performance level. For example, if the power of the received response from the selected component is not above a certain decibel (dB) level, the network device (or a user viewing the graph 530) may determine that the performance level of the selected component falls below a performance level. In some cases, this may allow the network device to troubleshoot a system as a whole. For example, the network device may test many CMs within a system and determine one or more CMs that are not performing above a performance level. The performance level may be defined by the received power, or one or more of the additional pieces of information received and reported during the testing of a selected CM.

Although user interface display 500 shows the table 505 and the graph 530 being displayed, the network device may utilize a number of different visualization techniques to display the results of the test.

Figure 6:
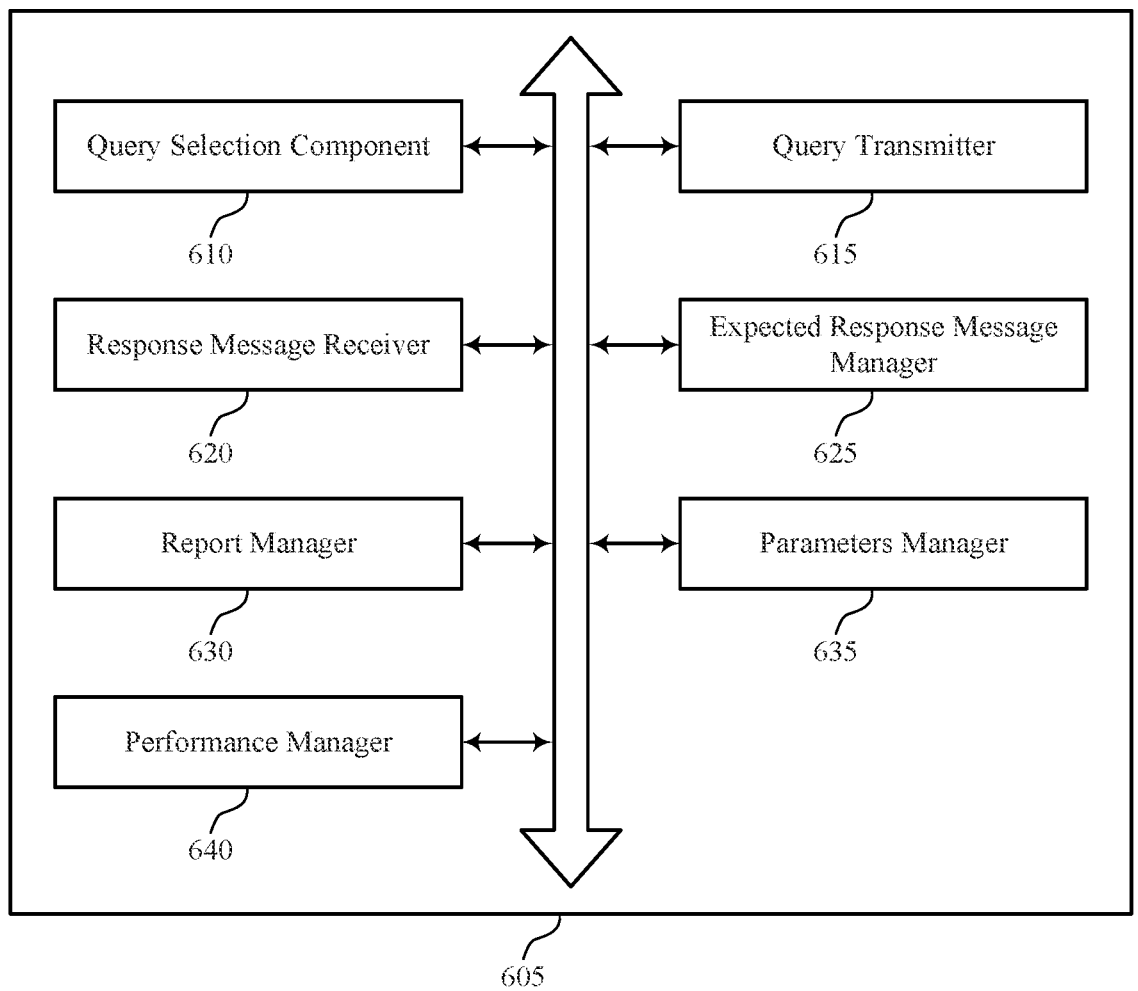
FIG. 6 shows a block diagram of a network device in accordance with the present disclosure.

FIG. 6 shows a block diagram 600 of a network device 605 that supports methods for testing cable modems in accordance with aspects of the present disclosure. The network device 605 may include the testing GUI as described with reference to FIGS. 1 and 2. The network device 605 may include a query selection component 610, a query transmitter 615, a response message receiver 620, an expected response message manager 625, a report manager 630, a parameters manager 635, and a performance manager 640. Each of these modules may communicate, directly or indirectly, with one another (e.g., via one or more buses).

The query selection component 610 may receive (e.g., from a GUI associated with a network) an indication of a selected query from a plurality of queries for transmission to the CM. In some examples, the query selection component 610 may receive (e.g., from the GUI) a second indication of a second selected query from the plurality of queries.

The query transmitter 615 may transmit, by the network, the selected query to the CM based on receiving the indication of the query. In some examples, the query transmitter 615 may transmit the second selected query to the CM, where the report is based on the selected query and the second selected query. In some cases, the query transmitter 615 may transmit, by a network, a query to the CM based on the one or more parameters. In some examples, the query transmitter 615 may transmit a query to the set of CMs.

The response message receiver 620 may receive a response message from the CM based on transmitting the selected query. The response message may include an MIB module. For example, the response message receiver 620 may receive, from the CM, a MIB module in response to the query. In some examples, the response message receiver 620 may receive, from one or more of the set of CMs, at least one response to the query.

The expected response message manager 625 may compare the received response message to an expected response message. The expected response message may be based on a the DOCSIS specification. In some cases, the expected response message includes at least one of the one or more parameters. Additionally or alternatively, the expected response message manager 625 may calculate a value based on the received response message, where the expected response message includes the value. In some examples, the expected response message manager 625 may indicate a noise source for the expected response message, where the comparing is based on the noise source.

The expected response message manager 625 may determine an expected MIB module to be received from the CM based on the DOCSIS specification, the one or more parameters, and the received MIB module. In some cases, the expected MIB module corresponds to a MIB module that complies with the DOCSIS specification.

The report manager 630 may generate a report indicating a status of the CM based on the comparing. In some cases, the status of the CM corresponds to a compliance of the response message with the DOCSIS specification. For example, the report manager 630 may generate a report indicating a compliance of the CM to the DOCSIS specification based on a comparison of the expected MIB module and the received MIB module. In some examples, the report manager 630 may determine that the received response message substantially matches the expected response message, where the status of the CM indicates the determining In some examples, the report manager 630 may generate a report indicating a status of the one or more of the set of CMs based on the at least one response. In some instances, the report manager 630 may transmit the report (e.g., for display at a GUI), where the determining the level of performance is based on transmitting the report.

The parameters manager 635 may identify one or more parameters associated with the CM. In some examples, the parameters manager 635 may query, by the network, a CMTS associated with the CM, the query including a MAC address associated with the CM. The parameters manager 635 may receive, from the CMTS, the one or more parameters based on the querying, where the one or more parameters are automatically identified based on the receiving the one or more parameters. In some examples, the parameters manager 635 may automatically identify the one or more parameters based on querying a CMTS associated with the CM. The one or more parameters may include an IP address, a channel identifier, frequency information, a release indicator, or a combination thereof. In some examples, the parameters manager 635 may identify one or more parameters associated with the CM, where the expected response message is based on the identifying.

The performance manager 640 may determine a level of performance of the one or more of the set of CMs based on the report. In some examples, the performance manager 640 may identify one CM of the set of CMs with a level of performance below a threshold level of performance based on the determining the level of performance Additionally or alternatively, the performance manager 640 may identify a group of CMs of the set of CMs with a level of performance below a threshold level of performance based on the determining the level of performance. The group of CMs may be associated with a same geographical area.

Figure 7:
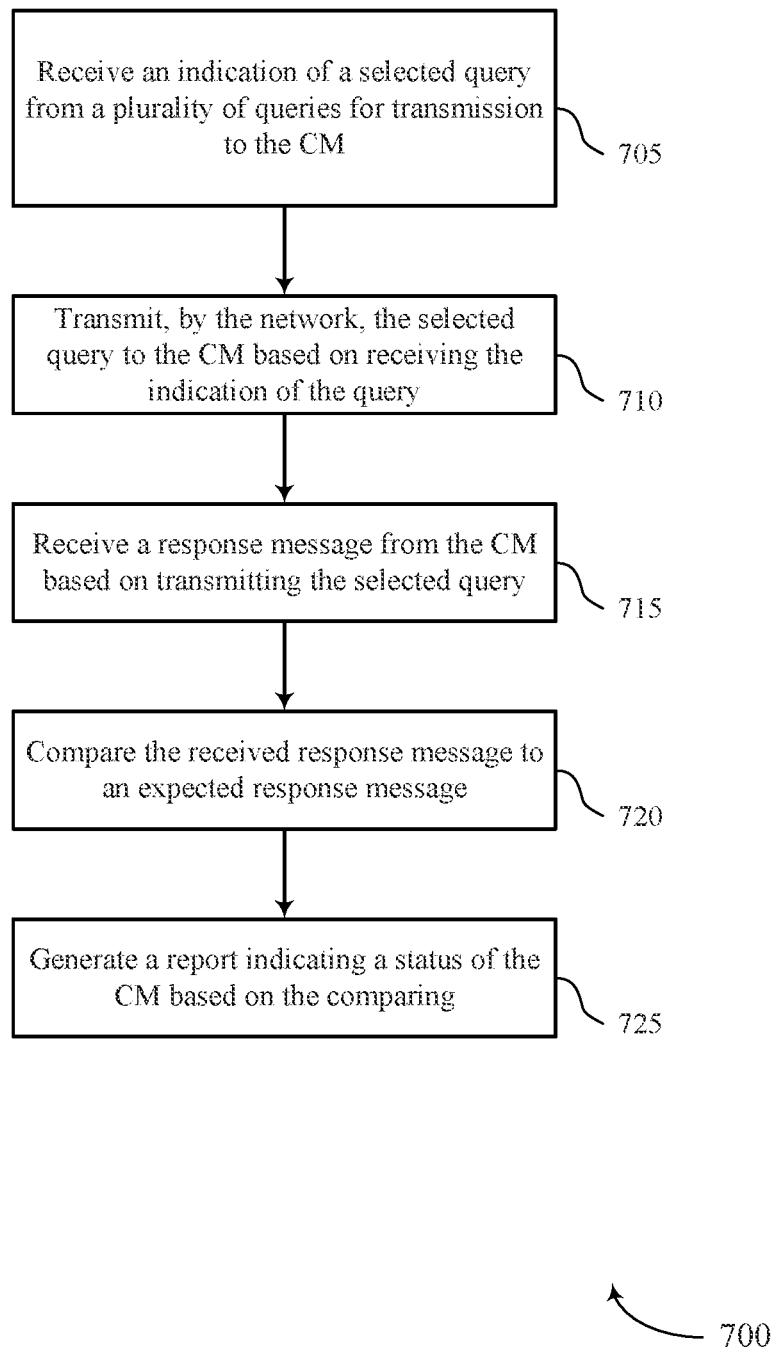
FIGS. 7 through 10 show flowcharts illustrating a method or methods in accordance with the present disclosure.

FIG. 7 shows a flowchart illustrating a method 700 that supports methods for testing cable modems in accordance with aspects of the present disclosure. The operations of method 700 may be implemented by a network device or its components as described herein. For example, the operations of method 700 may be performed by network device as described with reference to FIG. 6. In some examples, a network device may execute a set of instructions to control the functional elements of the network device to perform the described functions. Additionally or alternatively, a network device may perform aspects of the described functions using special-purpose hardware.

At 705, the network device may receive (e.g., from a GUI associated with a network) an indication of a selected query from a plurality of queries for transmission to the CM. The operations of 705 may be performed according to the methods described herein. In some examples, aspects of the operations of 705 may be performed by a query selection component as described with reference to FIG. 6.

At 710, the network device may transmit, by the network, the selected query to the CM based on receiving the indication of the query. The operations of 710 may be performed according to the methods described herein. In some examples, aspects of the operations of 710 may be performed by a query transmitter as described with reference to FIG. 6.

At 715, the network device may receive a response message from the CM based on transmitting the selected query. The operations of 715 may be performed according to the methods described herein. In some examples, aspects of the operations of 715 may be performed by a response message receiver as described with reference to FIG. 6.

At 720, the network device may compare the received response message to an expected response message. The operations of 720 may be performed according to the methods described herein. In some examples, aspects of the operations of 720 may be performed by an expected response message manager as described with reference to FIG. 6.

At 725, the network device may generate a report indicating a status of the CM based on the comparing. The operations of 725 may be performed according to the methods described herein. In some examples, aspects of the operations of 725 may be performed by a report manager as described with reference to FIG. 6.

Figure 8:
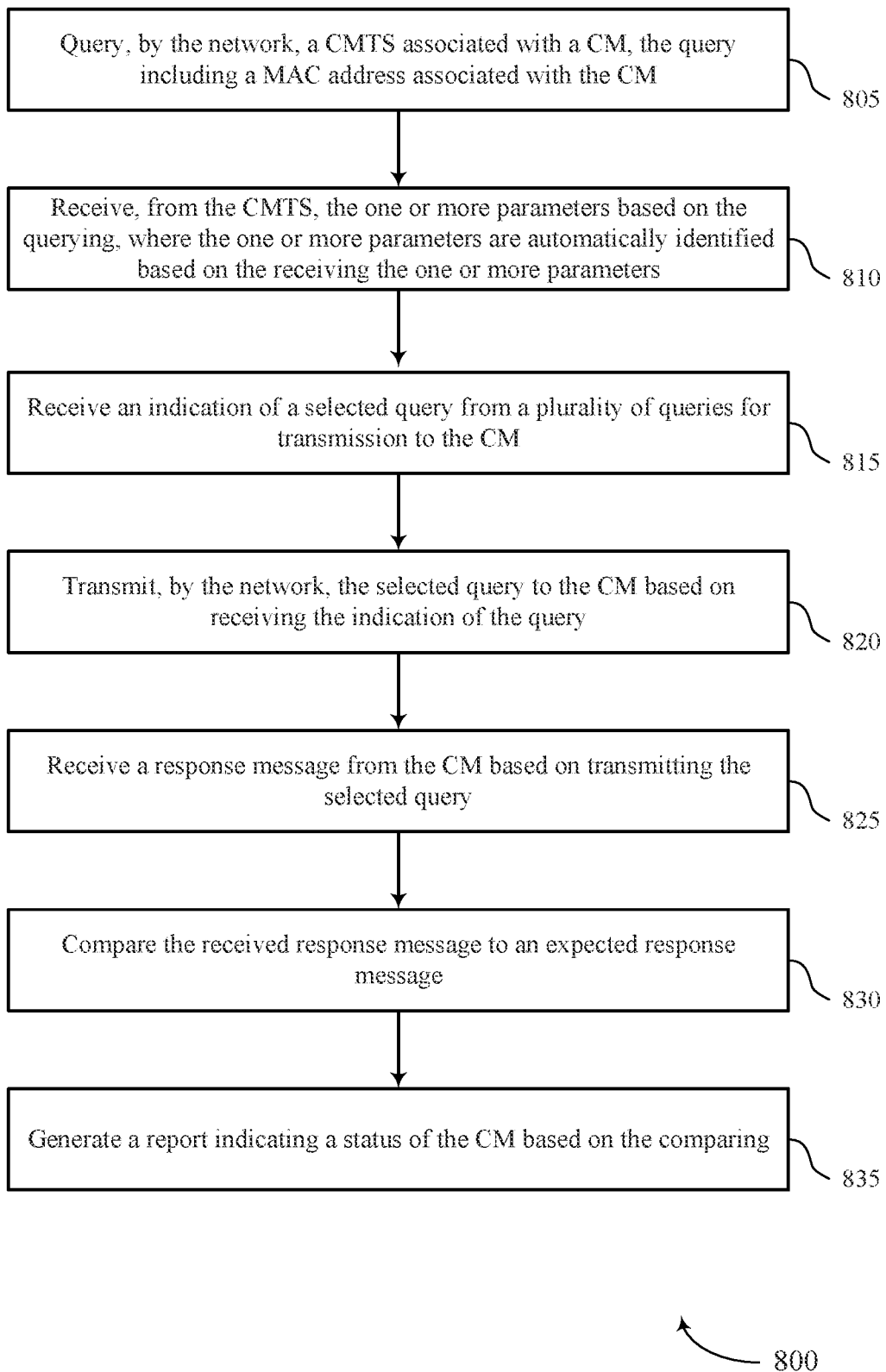

FIG. 8 shows a flowchart illustrating a method 800 that supports methods for testing cable modems in accordance with aspects of the present disclosure. The operations of method 800 may be implemented by a network device or its components as described herein. For example, the operations of method 800 may be performed by a network device as described with reference to FIG. 6. In some examples, a network device may execute a set of instructions to control the functional elements of the network device to perform the described functions. Additionally or alternatively, a network device may perform aspects of the described functions using special-purpose hardware.

At 805, the network device may query, by the network, a CMTS associated with the CM, the query including a MAC address associated with the CM. The operations of 805 may be performed according to the methods described herein. In some examples, aspects of the operations of 805 may be performed by a parameters manager as described with reference to FIG. 6.

At 810, the network device may receive, from the CMTS, the one or more parameters based on the querying, where the one or more parameters are automatically identified based on the receiving the one or more parameters. Here, the network device may identify one or more parameters associated with the CM, where the expected response message is based on the identifying. The operations of 810 may be performed according to the methods described herein. In some examples, aspects of the operations of 810 may be performed by a parameters manager as described with reference to FIG. 6.

At 815, the network device may receive (e.g., from a GUI associated with a network) an indication of a selected query from a plurality of queries for transmission to the CM. The operations of 815 may be performed according to the methods described herein. In some examples, aspects of the operations of 815 may be performed by a query selection component as described with reference to FIG. 6.

At 820, the network device may transmit, by the network, the selected query to the CM based on receiving the indication of the query. The operations of 820 may be performed according to the methods described herein. In some examples, aspects of the operations of 820 may be performed by a query transmitter as described with reference to FIG. 6.

At 825, the network device may receive a response message from the CM based on transmitting the selected query. The operations of 825 may be performed according to the methods described herein. In some examples, aspects of the operations of 825 may be performed by a response message receiver as described with reference to FIG. 6.

At 830, the network device may compare the received response message to an expected response message. The operations of 830 may be performed according to the methods described herein. In some examples, aspects of the operations of 830 may be performed by an expected response message manager as described with reference to FIG. 6.

At 835, the network device may generate a report indicating a status of the CM based on the comparing. The operations of 835 may be performed according to the methods described herein. In some examples, aspects of the operations of 835 may be performed by a report manager as described with reference to FIG. 6.

Figure 9:
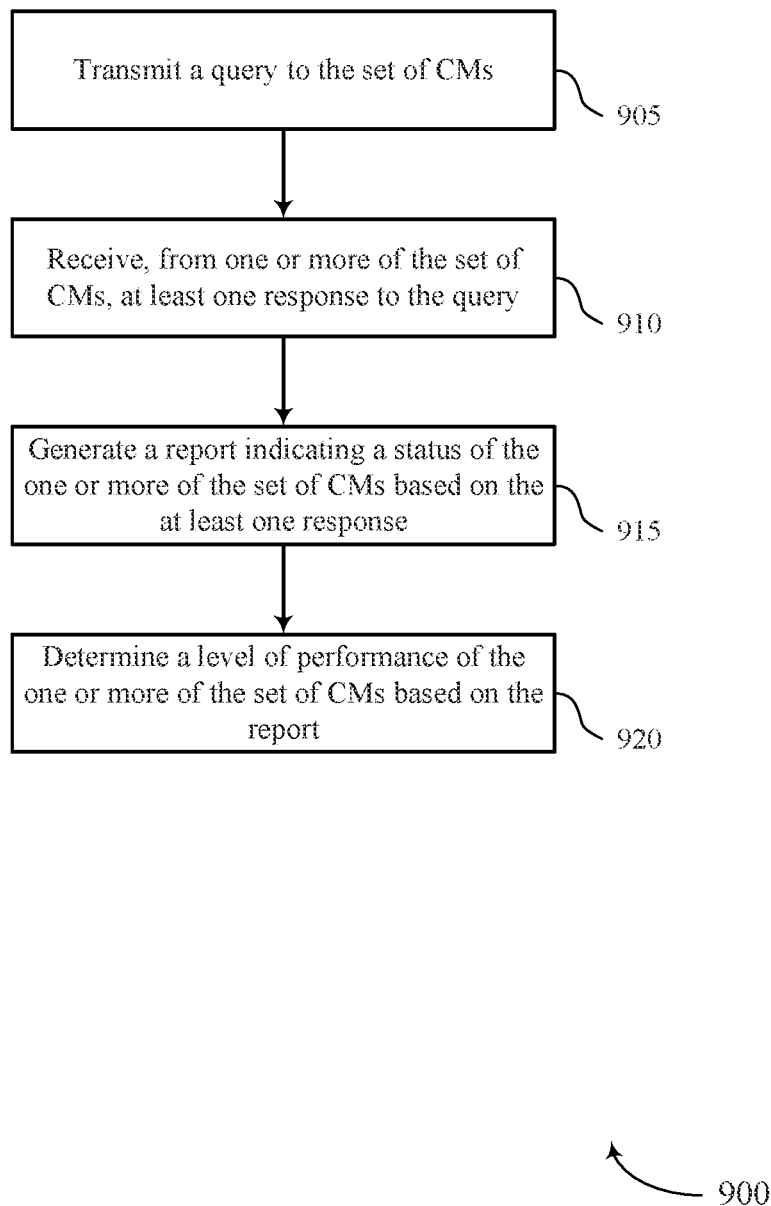

FIG. 9 shows a flowchart illustrating a method 900 that supports methods for testing cable modems in accordance with aspects of the present disclosure. The operations of method 900 may be implemented by a network device or its components as described herein. For example, the operations of method 900 may be performed by a network device as described with reference to FIG. 6. In some examples, a network device may execute a set of instructions to control the functional elements of the network device to perform the described functions. Additionally or alternatively, a network device may perform aspects of the described functions using special-purpose hardware.

At 905, the network device may transmit a query to the set of CMs. The operations of 905 may be performed according to the methods described herein. In some examples, aspects of the operations of 905 may be performed by a query transmitter as described with reference to FIG. 6.

At 910, the network device may receive, from one or more of the set of CMs, at least one response to the query. The operations of 910 may be performed according to the methods described herein. In some examples, aspects of the operations of 910 may be performed by a response message receiver as described with reference to FIG. 6.

At 915, the network device may generate a report indicating a status of the set of CMs based on the at least one response. The operations of 915 may be performed according to the methods described herein. In some examples, aspects of the operations of 915 may be performed by a report manager as described with reference to FIG. 6.

At 920, the network device may determine a level of performance of the one or more of the set of CMs based on the report. The operations of 920 may be performed according to the methods described herein. In some examples, aspects of the operations of 920 may be performed by a performance manager as described with reference to FIG. 6.

Figure 10:
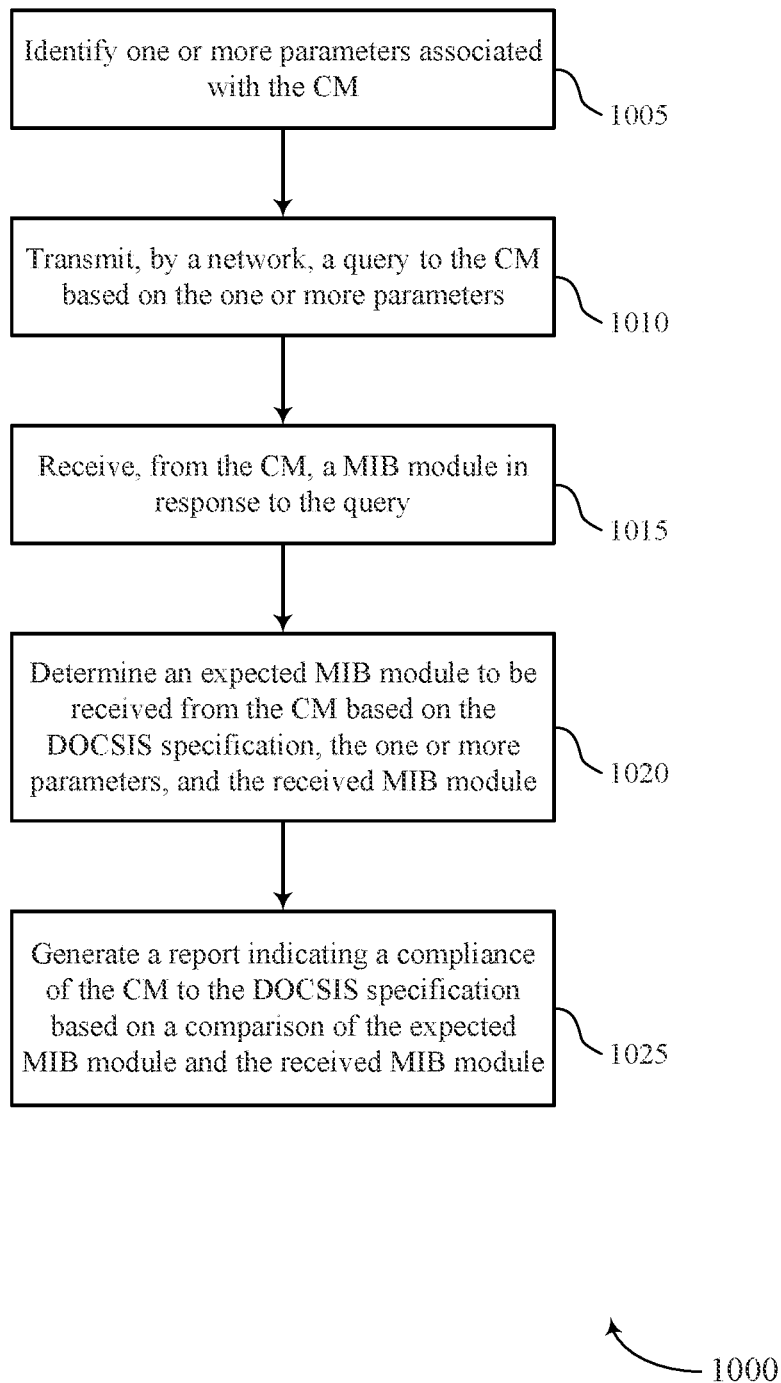

FIG. 10 shows a flowchart illustrating a method 1000 that supports methods for testing cable modems in accordance with aspects of the present disclosure. The operations of method 1000 may be implemented by a network device or its components as described herein. For example, the operations of method 1000 may be performed by a network device as described with reference to FIG. 6. In some examples, a network device may execute a set of instructions to control the functional elements of the network device to perform the described functions. Additionally or alternatively, a network device may perform aspects of the described functions using special-purpose hardware.

At 1005, the network device may identify one or more parameters associated with the CM. The operations of 1005 may be performed according to the methods described herein. In some examples, aspects of the operations of 1005 may be performed by a parameters manager as described with reference to FIG. 6.

At 1010, the network device may transmit, by a network, a query to the CM based on the one or more parameters. The operations of 1010 may be performed according to the methods described herein. In some examples, aspects of the operations of 1010 may be performed by a query transmitter as described with reference to FIG. 6.

At 1015, the network device may receive, from the CM, a MIB module in response to the query. The operations of 1015 may be performed according to the methods described herein. In some examples, aspects of the operations of 1015 may be performed by a response message receiver as described with reference to FIG. 6.

At 1020, the network device may determine an expected MIB module to be received from the CM based on the DOCSIS specification, the one or more parameters, and the received MIB module. The operations of 1020 may be performed according to the methods described herein. In some examples, aspects of the operations of 1020 may be performed by an expected response message manager as described with reference to FIG. 6.

At 1025, the network device may generate a report indicating a compliance of the CM to the DOCSIS specification based on a comparison of the expected MIB module and the received MIB module. The operations of 1025 may be performed according to the methods described herein. In some examples, aspects of the operations of 1025 may be performed by a report manager as described with reference to FIG. 6.

It should be noted that the methods described herein describe possible implementations, and that the operations and the steps may be rearranged or otherwise modified and that other implementations are possible. Further, aspects from two or more of the methods may be combined.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings. For example, the following list of example claims represents only some of the potential combinations of elements possible from the systems and methods described herein.

The singular forms "a," "an," and "the" include plural references unless the context clearly dictates otherwise. "Optional" or "optionally" may indicate that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A wireless mobile network testing device, comprising:
   a processor; and
   memory coupled with the processor and comprising instructions executable by the processor to cause the wireless mobile network testing device to:
      receive, via a user interface of the wireless mobile network testing device and from a user of the wireless mobile network device, a first indication of a suite of tests for determining a compliance of a component of a communication system to a telecommunications standard, wherein the suite of tests comprises reporting data for proactive network maintenance (PNM);
      receive, via the user interface and from the user, one or more parameters associated with the component;
      transmit, to the component, a query corresponding to the suite of tests based at least in part on receiving the first indication of the suite of tests from the user;
      receive a response message from the component based at least in part on transmitting the query corresponding to the suite of tests;
      compare the received response message to an expected response message to determine whether the received response message meets the telecommunications standard, wherein the expected response message is based at least in part on the one or more parameters received from the user; and
      display, via the user interface, a second indication of whether the component satisfies the suite of tests for determining the compliance of the component to the telecommunications standard.

2. The wireless mobile network testing device of claim 1, wherein the instructions are further executable by the processor to cause the wireless mobile network testing device to:
   generate the expected response message based at least in part on the one or more parameters associated with the component, the expected response message indicating requirements for satisfying the test for determining the compliance of the component to the telecommunications standard.

3. The wireless mobile network testing device of claim 1, wherein, to display the second indication of whether the component satisfies the test for determining the compliance of the component to the telecommunications standard, the instructions are further executable by the processor to cause the wireless mobile network testing device to:
   display, via the user interface, a first value of a parameter from the expected response message;
   display, via the user interface, a second value of the parameter from the received response message; and
   display, via the user interface, a third indication of whether the received response message satisfies the test for determining the compliance of the component to the telecommunications standard based at least in part on a relationship between the first value and the second value.

4. The wireless mobile network testing device of claim 1, wherein the instructions are further executable by the processor to cause the wireless mobile network testing device to:
display, via the user interface, a third indication of a plurality of tests for determining the compliance of the component to the telecommunications standard, wherein receiving the first indication of the suite of tests is based at least in part on displaying the third indication of the plurality of tests.

5. The wireless mobile network testing device of claim 1, wherein the instructions are further executable by the processor to cause the wireless mobile network testing device to:
display, via the user interface, a third indication of a plurality of components in the communication system, the plurality of components comprising at least the component; and
receive, via the user interface and from the user, a fourth indication of the component based at least in part on displaying the plurality of components in the communication system, wherein receiving the first indication of the suite of tests is based at least in part on receiving the fourth indication of the component.

6. The wireless mobile network testing device of claim 1, wherein the instructions are further executable by the processor to cause the wireless mobile network testing device to:
receive, via the user interface and from the user, a third indication for the component to be reset; and
transmit, to the component, a fourth indication for the component to reset based at least in part on receiving the third indication from the user.

7. The wireless mobile network testing device of claim 1, wherein the component comprises a cable modem (CM), an end device, a fiber node, a cable modem termination system (CMTS), a wireless base station, a macro cell, microcell, picocell, femtocell, a small cell, a split radio head, and virtualized radio head, or a combination thereof.

8. The wireless mobile network testing device of claim 1, wherein the telecommunications standard comprises one of the 3G, 4G, 5G, and 6G standard.

9. The wireless mobile network testing device of claim 1, wherein:
the expected response message comprises an expected management information base (MIB) module as defined by the telecommunications standard; and
the received response message comprises a received MIB module as defined by the telecommunications standard.

10. A method for testing a component for compliance to a telecommunications standard at a wireless mobile network testing device, the method comprising:
receiving, from a user of the wireless mobile network testing device, a first indication of a suite of tests for determining the compliance of the component of a communication system to the telecommunications standard, wherein the suite of tests comprises reporting data for proactive network maintenance (PNM);
receiving, from the user, one or more parameters associated with the component;
transmitting, to the component, a query corresponding to the suite of tests based at least in part on receiving the first indication of the suite of tests from the user;
receiving a response message from the component based at least in part on transmitting the query corresponding to the suite of tests;
comparing the received response message to an expected response message to determine whether the received response message meets the telecommunications standard, wherein the expected response message is based at least in part on the one or more parameters received from the user; and
displaying a second indication of whether the component satisfies the suite of tests for determining the compliance of the component to the telecommunications standard.

11. The method of claim 10, further comprising:
generating the expected response message based at least in part on the one or more parameters associated with the component, the expected response message indicating requirements for satisfying the suite of tests for determining the compliance of the component to the telecommunications standard.

12. The method of claim 10, wherein displaying the second indication further comprises:
displaying a first value of a parameter from the expected response message;
displaying a second value of the parameter from the received response message; and
displaying a third indication of whether the received response message satisfies the suite of tests for determining the compliance of the component to the telecommunications standard based at least in part on a relationship between the first value and the second value.

13. The method of claim 10, further comprising:
displaying a third indication of a plurality of tests for determining the compliance of the component to the telecommunications standard, wherein receiving the first indication of the suite of tests is based at least in part on displaying the third indication of the plurality of tests.

14. The method of claim 10, further comprising:
displaying a third indication of a plurality of components in the communication system, the plurality of components comprising at least the component; and
receiving, from the user, a fourth indication of the component based at least in part on displaying the plurality of components in the communication system, wherein receiving the first indication of the suite of tests is based at least in part on receiving the fourth indication of the component.

15. The method of claim 10, further comprising:
receiving, from the user, a third indication for the component to be reset; and
transmitting, to the component, a fourth indication for the component to reset based at least in part on receiving the third indication from the user.

16. The method of claim 10, wherein the component comprises a cable modem (CM), an end device, a fiber node, a cable modem termination system (CMTS), a wireless base station, a macro cell, microcell, picocell, femtocell, a small cell, a split radio head, and virtualized radio head, or a combination thereof.

17. The method of claim 10, wherein the telecommunications standard comprises one of the 3G, 4G, 5G, and 6G.

18. A wireless mobile network testing device, comprising:
a processor; and memory coupled with the processor and comprising instructions executable by the processor to cause the wireless mobile network testing device to:
- receive, via a user interface of the wireless mobile network testing device and from a user of the wireless mobile network testing device, a first indication of a suite of tests for determining a compliance of a plurality of components of a communication system to a telecommunications standard, wherein the suite of tests comprises reporting data for proactive network maintenance (PNM);
- receive, via the user interface and from the user, one or more parameters associated with one or more of the plurality of components;
- transmit, to the plurality of components, a query corresponding to the suite of tests based at least in part on receiving the first indication of the suite of tests from the user;
- receive at least one response message from one or more components of the plurality of components based at least in part on transmitting the query corresponding to the suite of tests;
- compare the at least one response message to corresponding expected response messages to determine whether the at least one received response message meets the telecommunications standard, wherein the corresponding expected response messages are based at least in part on the one or more parameters received from the user; and display, via the user interface, at least one second indication of whether the one or more of the plurality of components satisfies the suite of tests for determining the compliance of the plurality of components to the telecommunications standard.

19. The wireless mobile network testing device of claim 18, wherein the instructions are further executable by the processor to cause the wireless mobile network testing device to:
- generate the corresponding expected response messages based at least in part on the one or more parameters associated with the corresponding one or more components, the corresponding expected response messages indicating requirements for satisfying the suite of tests for determining the compliance of the one or more components to the telecommunications standard.

20. The wireless mobile network testing device of claim 18, wherein, to display each of the at least one second indication of whether the component satisfies the suite of tests for determining the compliance of the component to the telecommunications standard, the instructions are further executable by the processor to cause the wireless mobile network testing device to:
- display, via the user interface, a first value of a parameter from the corresponding expected response messages;
- display, via the user interface, a second value of the parameter from the received at least one response message; and
- display, via the user interface, corresponding third indications of whether the at least one received response message satisfies the suite of tests for determining the compliance of the component to the telecommunications standard based at least in part on a relationship between the first value and the second value.

* * * * *